April 12, 1927.  A. W. MACLEOD  1,624,750
MEANS FOR MEASURING BY VOLUME PETROL AND OTHER FLUIDS
Filed Aug. 10, 1925   2 Sheets-Sheet 1

A. W. MACLEOD 1,624,750

MEANS FOR MEASURING BY VOLUME PETROL AND OTHER FLUIDS

Filed Aug. 10, 1925

Patented Apr. 12, 1927.

1,624,750

UNITED STATES PATENT OFFICE.

ARTHUR WILLIAM MACLEOD, OF LONDON, ENGLAND.

MEANS FOR MEASURING BY VOLUME PETROL AND OTHER FLUIDS.

Application filed August 10, 1925, Serial No. 49,332, and in Great Britain August 28, 1924.

This invention relates to apparatus for measuring liquid by volume in which the liquid to be measured is fed by a pump or by other suitable means, and which measuring apparatus receives the liquid to be measured and permits it to flow intermittently in predetermined units of quantity, which units may be added and indicated by any suitable mechanism.

The measuring apparatus consists of a stationary measuring cylinder having a piston working therein and carrying a piston rod. This piston rod extends through a stuffing box in the cylinder cover at one end and the other end may be received in a case extending beyond the cylinder cover.

The cylinder is formed with ports at each end which alternately perform the function of inlet and discharge, and each port communicates with a valve chamber containing two valves, one of which remains closed during the whole period of the opening, the open period, and closing of the other valve, which then remains closed while the first valve opens, remains open, and then closes. In this way each port communicating with the cylinder is alternately opened to the supply of the liquid to be measured, which supply entrance is then securely closed, while the valve to the discharge becomes opened, and remains open during the travel of the piston in the direction of the port, the movement of the piston being caused by the pressure of the inflowing liquid (which is supplied under slight pressure) on the other side of the piston.

The valves controlling the inlet and discharge ports of the measuring cylinder are operated by the piston of an auxiliary cylinder which is supplied with liquid from the main supply, the valves of the auxiliary cylinder being reversed by the action of the piston in the measuring cylinder immediately prior to the completion of each stroke.

The auxiliary cylinder is supplied with liquid from the main supply, and its admission to the auxiliary cylinder is controlled by a spring-loaded back-pressure valve leading to an air dome or chamber, from which there is a restricted passage to the auxiliary cylinder. The action of the spring on the spring-loaded back-pressure valve is such that a greater pressure per square inch of its area is required to open it than is required to move the piston of the measuring cylinder. The object of this is to necessitate the piston of the measuring cylinder completing its stroke before the back pressure valve can open. The flow of liquid into the air dome or chamber compresses the air in the upper portion of the chamber, and upon the closing of the back pressure valve the expansion of the compressed air continues to feed the liquid in the chamber to the auxiliary cylinder.

The invention will be further described with reference to the accompanying drawings, wherein an example of construction of an apparatus for measuring liquid, for instance petrol, by volume is shown.

Figure 1:
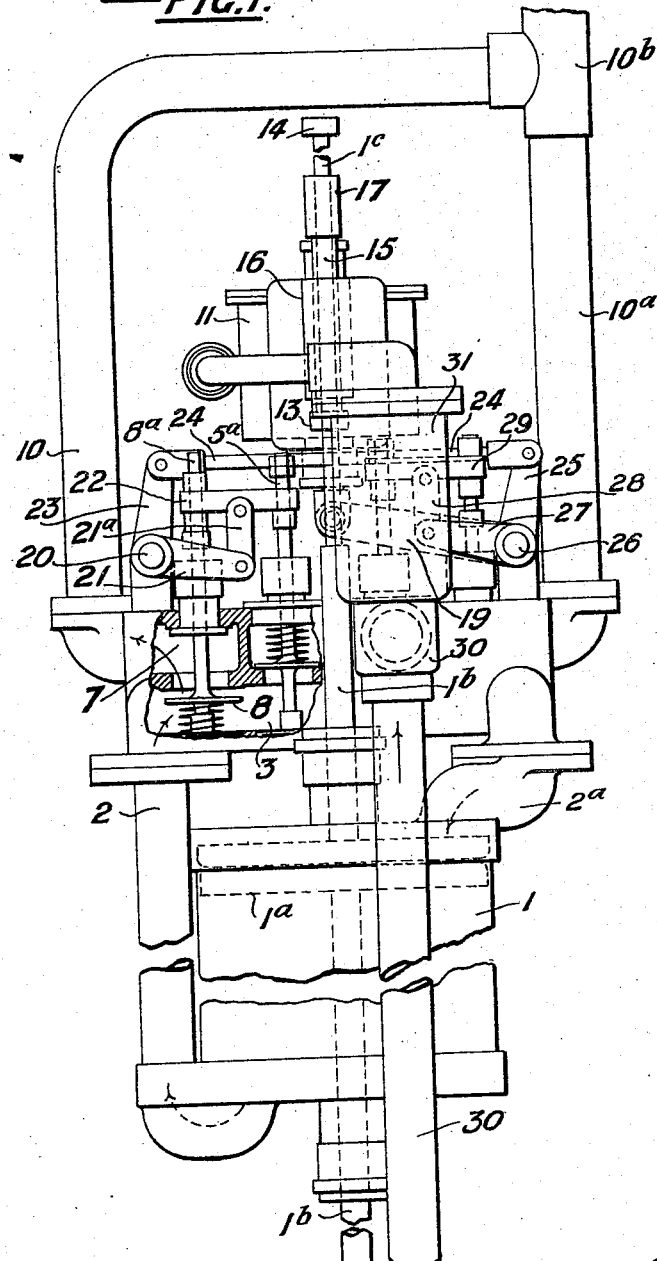
Fig. 1 is a front elevation.

A cylinder 1 which acts as a measuring chamber, is formed with a port at each end connected by pipes 2, $2^a$ with valve chambers 3, $3^a$ alternately performing the function of inlet and discharge of the liquid. Within the cylinder 1 is a piston $1^a$, the piston rod $1^b$ of which extends from both sides of the piston and passes through stuffing boxes on the cylinder covers.

Each of the two valve chambers 3, $3^a$ communicates with a chamber 4 through ports controlled by valves 5, 6, the chamber 4 being open to the supply of liquid. The chambers 3 and $3^a$ communicate respectively with chambers 7, $7^a$ controlled by valves 8, 9, the chambers 7, $7^a$ being connected by pipes 10, $10^a$ with the discharge outlet $10^b$, Fig. 1. The pair of valves controlling each valve chamber are of disc form and their rods pass through stuffing boxes on the upper side of the valve chambers.

Figure 2:
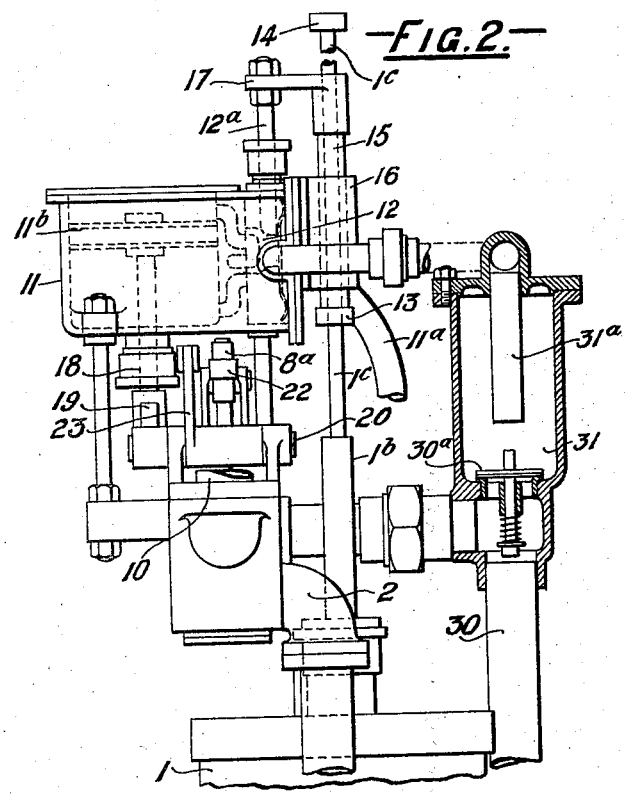
Fig. 2 is a side elevation partly in section.

The valves 5, 8 and 6, 9 are controlled and reversed by the movement of a piston $11^b$, Fig. 2, in an auxiliary cylinder 11. This auxiliary cylinder is supplied with liquid from the main supply pipe 30, and the exhaust returns the liquid by the tube $11^a$ to the tank from which the supply to the measuring apparatus is pumped. The slide valve 12 (shown in dotted lines at Fig. 2) controlling the admission and exhaust of liquid to and from the auxiliary cylinder 11 is moved by means of tappets 13, 14 on the upper reduced end $1^c$ of the piston rod $1^b$. The reduced end $1^c$ of the piston rod $1^b$ passes freely through a sleeve 15 which latter is guided and is movable longitudinally within a bearing 16 and the sleeve 15 is connected by a bracket 17 to the rod 12ª which carries the slide valve 12 of the auxiliary cylinder 11.

Immediately prior to the completion of each stroke of the piston 1ª, one of the tappets 13 or 14 will engage with the upper or lower end of the sleeve 15 and slide it longitudinally in its bearing, causing the slide valve 12 to be reversed. The piston rod 18 of the auxiliary cylinder piston 11ᵇ, Fig. 2, extends through the lower end of the cylinder 11, and is connected to an arm 19 mounted upon a rock shaft 26, Figs. 1 and 3, which carries an arm 27 connected at its free end by a link 28 with a cross head 29 through which the valve rods 6ª and 9ª pass. An arm 25 on the rock shaft 26 and a link 24 connect with an arm 23 carried on a rock shaft 20, which is connected through arm 21 and link 21ª with a second cross head 22 through which pass the valve rods 5ª and 8ª.

The liquid inlet pipe 30 connects with the valve chamber 4 and also through a spring-loaded back-pressure valve 30ª with an air dome or chamber 31 from which liquid can pass to the auxiliary cylinder 11 through pipe 31ª of smaller cross section. Liquid passes from the pipe 30 to the chamber 4, and thence, valve 6 being open, through chamber 3ª and pipe 2ª into the upper end of the cylinder 1, and forces the piston 1ª downward, liquid in the cylinder beneath the piston being forced through the pipe 2, chamber 3, and pipe 10 to the discharge at 10ᵇ.

The downward movement of the piston 1ª and rod 1ᵇ brings tappet 14 into contact with the top end of the sleeve 15 and moves the slide valve 12 of the auxiliary cylinder, when the piston of the measuring cylinder 1 approaches the end of its stroke. Just after the tappet has caused the valve in the auxiliary cylinder to be reversed, the piston in the measuring cylinder 1 arrives at the end of its stroke, and the pressure of the supply liquid being unable to move the piston 1ª any further, the pressure of the liquid supply rises and overcomes the resistance of the back-pressure valve 30ª communicating with the chamber 31 and passage to the auxiliary cylinder 11 and causes the piston within it to travel from one end of the auxiliary cylinder to the other. The small size of the pipe 31ª, Fig. 2, from the chamber 31 to cylinder 11 relatively to the size of the pipe 30, causes a back pressure when the main supply to the measuring cylinder is interrupted, and the compressed air in the air space in the upper part of the chamber 31 maintains the flow to the auxiliary cylinder after the back-pressure valve 30ª is closed. This action causes the piston rod 18 of the auxiliary cylinder 11 to move, and to positively reverse the four valves controlling the supply of liquid to the measuring cylinder 1, namely the two supply valves 5 and 6 and the two discharge valves 8 and 9. This reversing action is effected by the movement of the piston rod 18 of the auxiliary cylinder rocking arm 19 and rock shaft 26, the said shaft rocking a similar shaft 20 through the medium of an arm 25, connecting rod 24, and an arm 23. The two shafts 20 and 26 carry the arms 21, 27 projecting in opposite directions, which by means of the links 21ª, 28 move the two cross heads 22 and 29 in opposite directions.

These cross heads 22, 29 slide upon the valve rods and engage stops thereon, the cross head 22 acting upon stops 5ᵇ and 8ᵇ, and the cross head 29 acting upon stops 6ᵇ and 9ᵇ. The cross heads act in such a way that the supply valve and discharge valve to one end of the measuring cylinder are both moved in one direction, but being seated in opposite directions spring-pressed to their seatings, cause say the supply to be opened and the discharge closed, whilst the other cross head being similarly connected to two valves which control the other end of the supply cylinder, cause the discharge to be opened and the supply closed. These valves are operated so as to open in the opposite direction to the flow, so that the pressure of the liquid tends to keep the valves closed. The stops are so placed on the valve rods that the cross heads operate on one valve in each pair in advance of the other valve, thus ensuring that the supply and discharge are not opened at the same time.

Figure 3:
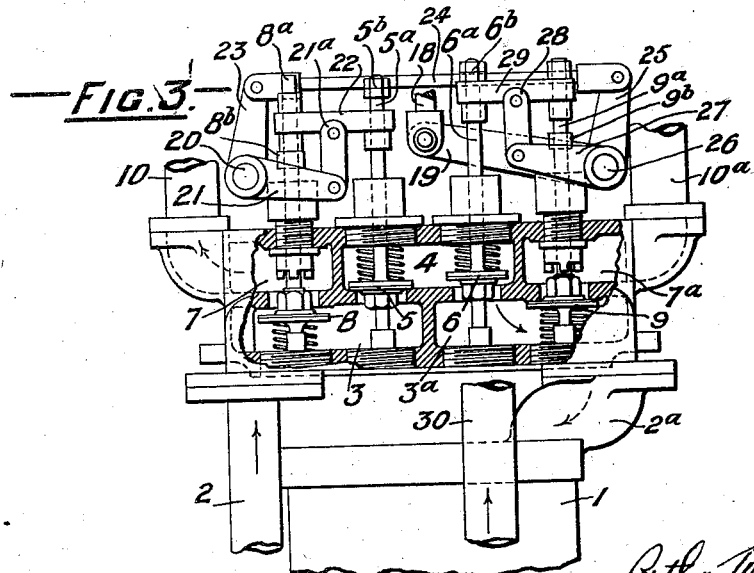
Fig. 3 is a sectional elevation showing the valve chamber and valves for the supply and discharge of liquid.

In the position of the apparatus shown at Figs. 1 and 3, the piston 1ª in the measuring cylinder has reached the top of its stroke and the valve 6 is open to admit the liquid from the chamber 4 by the pipe 2ª to the top of the measuring cylinder, while the valve 8 is open to allow the liquid to pass from beneath the piston 1ª.

The downward movement of the tappet 14 of the piston rod of the measuring cylinder contacts with the sleeve 15 and operates the slide valve 12 of the auxiliary cylinder when the piston of the measuring cylinder approaches the end of its stroke. Just after the tappet 14 has caused the valve in the auxiliary cylinder 11 to be reversed, the piston 1ª in the measuring cylinder 1 arrives at the end of its stroke, and immediately the pressure of the supply liquid in the pipe 30 rises and opens the back-pressure valve 30ª, Fig. 2, and enters the chamber 31 and passes through the pipe 31ª to the auxiliary cylinder 11 and causes the piston therein to commence to travel in the auxiliary cylinder, the small diameter of the pipe 31ª causing a resistance, due to which air is compressed in the top of the chamber 31. Upon the closing of the back-pressure valve 30ª, due to the resumption of flow to the measuring cylinder and the consequent reduction of pressure of the supply liquid, the expansion of the air trapped in the upper part of the chamber 31 maintains the flow of liquid to the auxiliary cylinder 11 and completes the movement of the piston therein.

It will be observed that the valves at Fig. 3 are operated so as to open in the opposite direction to the flow so that the pressure of the liquid tends to keep the valves closed.

It will now be understood that when the piston of the measuring cylinder reaches the end of its stroke and the pressure increases in the pipe 30, the valve 30ª will be lifted from its seat and the liquid will be forced into the chamber 31 and will pass up the small pipe 31ª and act upon the auxiliary piston 11ᵇ, this direct force of liquid continuing in its action until the auxiliary piston has moved sufficiently far to partially open the valves 5 and 9. Directly the valves 5 and 9 become open, the pressure will fall in the pipe 30 and the liquid would not operate the auxiliary piston to the end of its stroke, but in the construction according to this invention, directly the pressure falls in the pipe 30, the back-pressure valve 30ª closes, and there remains air-pressure in the upper part of the chamber 31 which acts on the liquid therein and maintains it at sufficient pressure to complete the movement of the auxiliary piston 11ᵇ so as to bring it to the end of its stroke.

What I claim as my invention and desire to secure by Letters Patent is:—

1. Apparatus for measuring liquids by volume, comprising in combination a measuring cylinder having ports at the ends thereof for the inlet and discharge of liquid, valves to control said ports, a piston and piston rod free to reciprocate in said measuring cylinder, an auxiliary cylinder having ports at the ends thereof for the inlet and discharge of liquid, a piston and piston rod free to reciprocate in said auxiliary cylinder, a slide valve for controlling the inlet and discharge ports of said auxiliary cylinder, means on the piston rod of the piston of said measuring cylinder to coact with said slide valve of said auxiliary cylinder to mechanically reverse the position of said slide valve immediately prior to the piston rod of the measuring cylinder reaching the end of its stroke, a main supply pipe to convey the supply of liquid under pressure to said valves of said measuring cylinder, a branch pipe from said main supply pipe extending to said auxiliary cylinder, a spring-loaded back-pressure valve in said branch pipe to permit of the passage of pressure liquid to said slide valve of said auxiliary cylinder only when said piston of said measuring cylinder arrives at the end of its stroke and the liquid pressure in said branch pipe increases, and means connecting the inlet and discharge valves of said measuring cylinder with the piston rod of said auxiliary cylinder to cause the movement of the said piston rod of said auxiliary cylinder to reverse the flow to and from said measuring cylinder at the end of each stroke of said piston in said measuring cylinder.

2. Apparatus for measuring liquids by volume, comprising in combination a measuring cylinder having ports at the ends thereof for the inlet and discharge of liquid, valves to control said ports, a piston and piston rod free to reciprocate in said measuring cylinder, an auxiliary cylinder having ports at the ends thereof for the inlet and discharge of liquid, a piston and piston rod free to reciprocate in said auxiliary cylinder, a slide valve for controlling said inlet and discharge ports of said auxiliary cylinder, means on the piston rod of the piston of said measuring cylinder to coact with said slide valve of said auxiliary cylinder to mechanically reverse the position of said slide valve immediately prior to the piston rod of the measuring cylinder reaching the end of its stroke, a main supply pipe to convey the supply of liquid under pressure to said valves of said measuring cylinder, an air chamber having a passage communicating with said main supply pipe, a spring-loaded back-pressure valve governing said passage, to permit pressure liquid to pass from said main supply pipe to said air chamber only when said piston of said measuring cylinder arrives at the end of its stroke and the liquid pressure in said main supply pipe increases, a pipe of smaller diameter than the main supply pipe depending into the upper end of said air chamber and extending to the auxiliary cylinder to supply same with liquid, and means connecting the inlet and discharge valves of said measuring cylinder with the piston rod of said auxiliary cylinder to cause the movement of the said piston rod of said auxiliary cylinder to reverse the flow to and from said measuring cylinder at the end of each stroke of said piston in said measuring cylinder.

3. Apparatus for measuring liquids by volume, comprising in combination a measuring cylinder having ports at the ends thereof for the inlet and discharge of liquid, a piston and piston rod free to reciprocate in said measuring cylinder, a chamber, a main supply pipe to convey liquid under pressure to said chamber, two spring closing valves for controlling the supply from said chamber to said measuring cylinder, two spring closing valves for controlling the discharge ports of the measuring cylinder when the supply to that end of said measuring cylinder is closed, an auxiliary cylinder having ports at the ends thereof for the inlet and discharge of liquid, a piston and piston rod free to reciprocate in said auxiliary cylinder, a slide valve for controlling the inlet and discharge ports of said auxiliary cylinder, means to connect the piston rod of said measuring cylinder with the slide valve of said auxiliary cylinder to reverse the position of said slide valve immediately prior to the piston rod of the measuring cylinder reaching the end of its stroke, a branch pipe from said main supply pipe extending to said auxiliary cylinder to supply pressure liquid thereto, a spring-loaded back-pressure valve in said branch pipe to permit of the passage of liquid only when at a pressure greater than that required to move the piston of said measuring cylinder to the end of its stroke, means in connection with the piston rod of said auxiliary cylinder for opening and closing the spring closing valves.

In witness whereof I have hereunto set my hand.

ARTHUR WILLIAM MACLEOD.